April 12, 1955   F. P. GRANGER, JR   2,706,241
ELECTRIC HEATER
Filed Dec. 11, 1953   2 Sheets-Sheet 1

INVENTOR.
FRED P. GRANGER JR.
BY
ATTORNEY

April 12, 1955     F. P. GRANGER, JR     2,706,241
ELECTRIC HEATER

Filed Dec. 11, 1953     2 Sheets-Sheet 2

INVENTOR.
FRED P GRANGER JR
BY
ATTORNEY

United States Patent Office 2,706,241
Patented Apr. 12, 1955

2,706,241

ELECTRIC HEATER

Fred P. Granger, Jr., Garland, Tex.

Application December 11, 1953, Serial No. 397,611

1 Claim. (Cl. 219—39)

This invention relates to space heaters and more particularly to electric heaters.

Drive-in motion picture theatres, if they are to operate at a profitable capacity during periods of cold weather, must provide some means for warming the interiors or passenger compartments of the automobiles of the spectators. It has been found that patrons object to operating their own automobile heaters by running the automobile motors due to the excessive consumption of fuel and because the noise of the running automobile motor interferes with the enjoyment of the motion picture being shown. It is desirable, therefore, to provide a heater which may be supported on the loud-speaker supporting posts of the drive-in theatre when not in use and which can be easily placed in an automobile through an opened window to rest upon the floor of the passenger compartment thereof. Such a heater should preferably be provided with a switch which will automatically maintain the heater inoperative when the heater is supported on the posts and also when the heater is not disposed properly in the car in order to prevent damage to the heater through the carelessness of the theatre patrons. The heater should be so constructed that the housing thereof which the patrons may touch is never raised to a dangerously high temperature and, in addition, the heater should be provided with a thermostat which will shut off the heater when the temperature of the air being circulated through the heater exceeds a predetermined value.

Accordingly, it is an object of the invention to provide a new and improved electric heater.

It is another object of the invention to provide a new and improved electric heater having means for allowing operation of the heater only when it is in proper operating position.

It is still another object of the invention to provide a new and improved electric heater having means for stopping operation of the heater when the temperature of the heated space exceeds a predetermined value.

Other features and aspects of the invention will be apparent from a consideration of the following detailed description taken in connection with the accompanying drawing in which.

Figure 2:
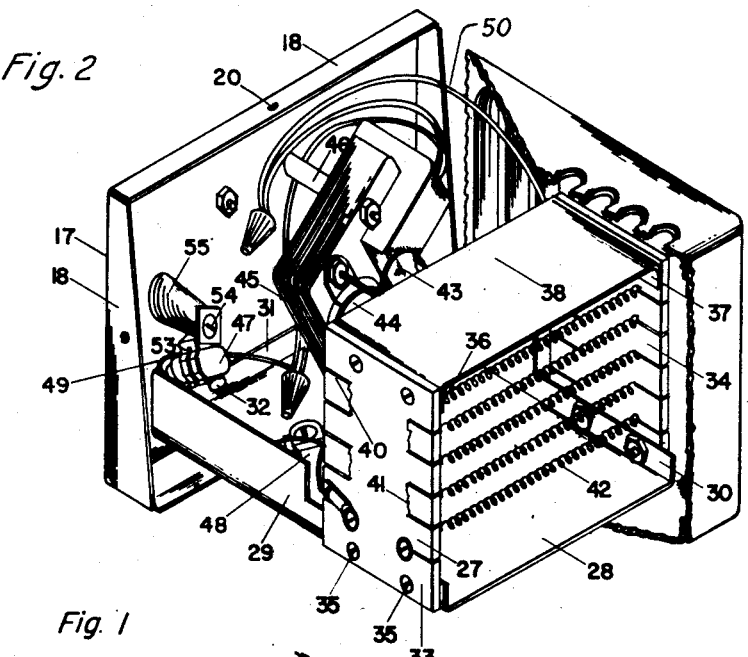
Figure 2 is a perspective view of the heater shown in Figure 1 with portions of the outer case broken away to show the internal construction of the heater.
Figure 1:
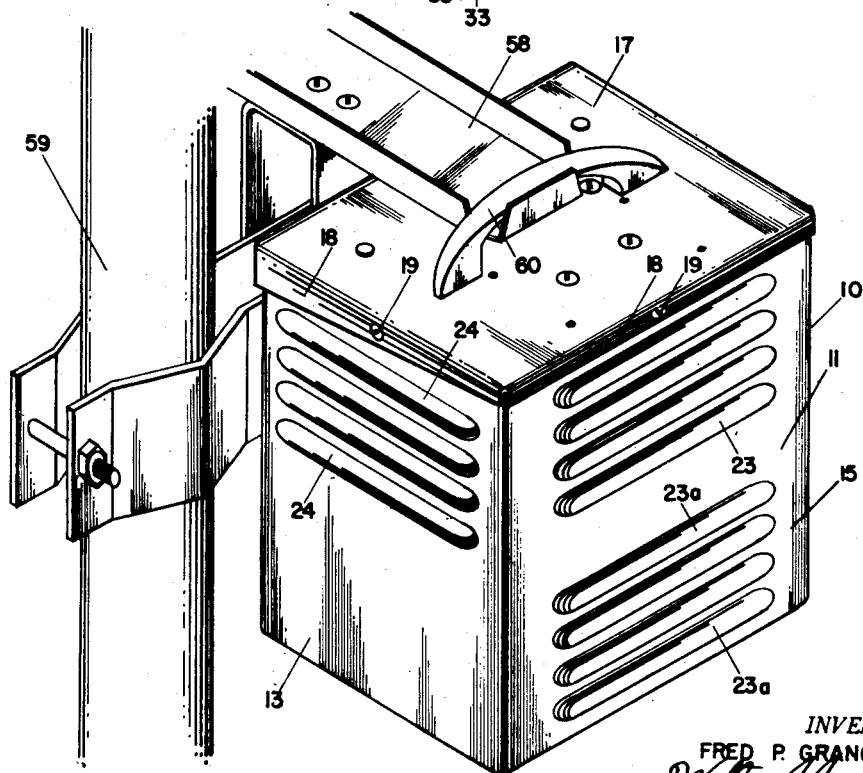
Figure 1 is a perspective view of the electric heater.
Figure 4:
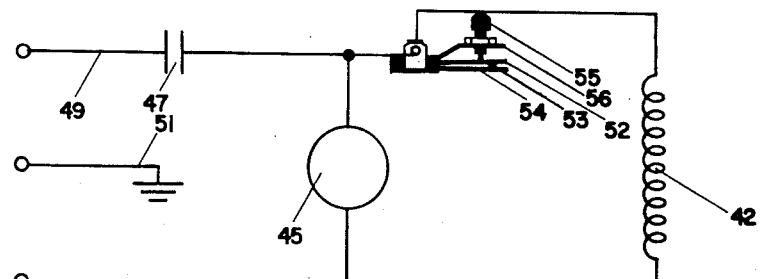
Figure 4 is a diagrammatic illustration of the electrical connections of the heater and also shows in profile a thermostatic switch employed in the invention.
Figure 3:
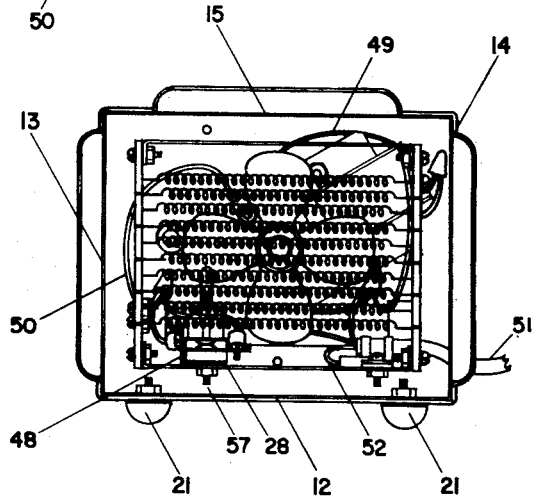
Figure 3 is an end elevation of the heater shown in Figure 1 with the end of the outer case broken away to show the internal construction of the heater.
Figure 5:
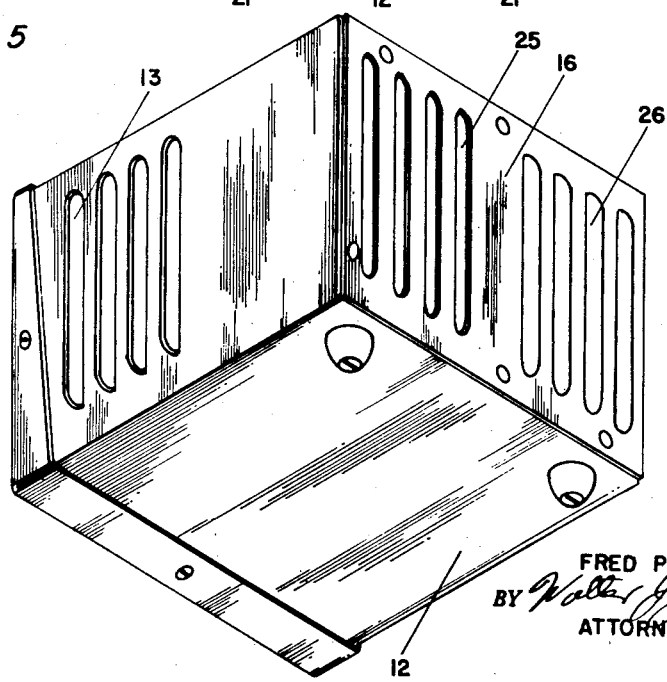
Figure 5 is a perspective view showing the bottom of the heater.

Referring now to the drawing, the heater 10 includes an outer rectangular case 11 having an imperforate bottom wall 12, a pair of side walls 13 and 14, a top wall 15 and an end wall 16. The open end of the case is closed by a detachable end panel 17 having four inturned flanges 18 which overlap and abut adjacent end portions of the bottom, top, and side walls of the case. The flanges are secured to these walls by screws 19 which extend through the apertures 20 in the flanges of the end panel into registering threaded apertures in the case walls. The bottom wall 12 of the case is provided with a pair of rubber feet or cleats 21 which tilt upwardly the end of the heater remote from the end panel.

The top wall is provided with two sets of louvers 23 and 23a which are spaced throughout the length of the case while the side walls 13 and 14 are provided with louvers 24 only in the portion adjacent to the end panel 17. The end wall 16 is provided with two sets 25 and 26 of louvers which open in opposite directions. The louvers in the case are provided to permit air to be drawn through the louvers 23 of the top walls and the louvers 24 of the side wall into the case and be expelled, after heating, through the louvers 23a of the top wall and the louvers 25 and 26 of the end wall.

A heater assembly 27 is supported in the case adjacent the end wall 17 by means of a supporting plate 28 having upturned side flanges 29 and 30 and end flange 31 which abuts the end panel 17 and is rigidly secured thereto by rivets 32.

The heater assembly comprises a pair of vertical strips 33 and 34, of asbestos or other insulating material, whose lower ends are rigidly secured to the side flanges 29 and 30, respectively, of the supporting plate by screws 35 and whose upper ends are connected to the dependent end flanges 36 and 37, of a metal baffle plate 38 which extends between the strips. The two strips are thus supported in rigid spaced relation to one another.

The strips are provided with side slots 40 through which extend straightened portions 41 of heater coils 42 to hold the various sections of the coils in properly spaced positions extending between the insulating strips. The coils are formed of suitable resistive material, such as a nickel or chrome alloy, which may be heated to a high temperature by the passage of current therethrough without losing its mechanical strength and without becoming susceptible to excessive oxidation or corrosion.

Air drawn from without the case through the louvers 23 of the top wall and the louvers 24 of the side walls is blown past the heater coils 42 and then out of the case through the louvers 25 and 26 of the end wall 16 and also through the louvers 23a of the top wall by a fan 43 mounted on the shaft 44 of a motor 45. The motor 45 is mounted on the panel 17 by means of posts 46. The fan is disposed forwardly of the louvers 24 of the side walls and between the two sets of louvers 23 and 23a of the top wall so that it circulates air through the case in the manner described above.

The operation of the fan 43 and the heater coils or elements 42 is controlled by a mercury switch 47 and a thermostat switch 48 which are connectible to a source of electrical current by means of the conductors 49 and 50 of a cord 51 which extends out of the case through a suitable aperture therein. The cord 51 which includes a third conductor 52 which is connected to the supporting plate 28 so that the heater case may be connected to ground by the third conductor to ground the case.

The mercury switch 47 is supported in a predetermined position by a clip bracket 53a which is mounted on the panel 17 by a bolt 54a having a spacer sleeve 55a which spaces the mercury switch from the panel 17.

The mercury switch may be of the type disclosed in the patent issued to McCabe, Serial No. 2,018,310, which contains a drop of mercury in a glass bulb, the drop of mercury connecting the two terminals of the switch to connect the motor and heater element circuit across the conductors 50 and 49 when the bulb is disposed in a particular position. When the bulb is moved or tilted to any other position, the drop of mercury moves away from the two terminals thus disconnecting the motor and the heater elements from the source of electric current.

The mercury switch is so mounted on the end panel 17 that it is closed only when the heater is positioned in an upright position on a supporting surface, such as the floor of an automobile with the feet 21 contacting the supporting surface, or when the heater is turned to a position wherein the end panel 17 faces downwardly and the end wall 16 faces upwardly. In all other positions of the heater, the mercury switch is open so that if the heater is placed on one of its side walls 13 or 14, its top wall 15, or its end wall 16, the mercury switch will be open and prevent energization of the motor and the heater coils. This ensures that the heater coils and the motor can be energized only when all the louvers are unobstructed and proper circulation of air can take place through the heater precluding overheating of the case walls which must remain relatively cool at all times so that persons touching the case will not be hurt by contact with the heater. The supporting plate 28 is spaced from the bottom top, side, and end walls of the case to ensure that the case walls will not become heated by conduction of heat from the heater elements through the support panel 28. In addition the insulation strips 33 and 34, the baffle plate 38 and the support panel 28 prevent direct radiation of heat to the side and bottom walls of the case thus helping to prevent an undue rise in temperature of these walls.

The thermostat 48 may be of any conventional type such as one using a bimetallic strip 52 which bends upwardly to move the contact 53 on the end thereof out of engagement with the stationary contact 54. A screw 55 threaded through an aperture in a fixed bracket 56 secured to the support plate 28 by a bolt 57 may be employed to vary the force tending to maintain the two contacts in engagement so that the temperature at which the switch opens may be adapted to open when the temperature exceeds any desired value within a certain range.

When not in use, the heater 10 is hung on a suitable bracket 58 fixed to the loud speaker post 59 of an outdoor theatre by means of its handle 60, which is fixed to the end wall, with conductors 49 and 50 connected to supply line terminals and the conductor 51 connected to ground. In this position, the mercury switch is open. When it is desired to employ the heater to heat the interior or passenger compartment of an automobile parked adjacent the post 59, the heater is lifted off the bracket 58 and brought into the interior of the automobile through an opened window. The heater is placed on the automobile floor in a position to blow heated air to a desired area of the automobile interior. The mercury switch 47 closes when the heater is placed on the floor on its feet 21 and the opposite edge of the bottom wall 12.

The motor 45, and heater coils 42 are thus automatically energized when the heater is properly positioned on the floor and the heater heats and circulates air through the passenger compartment of the automobile. The thermostat opens when the temperature in the passenger compartment exceeds a predetermined value and closes when the temperature drops below the predetermined value. The temperature of the case 11 rises, of course, but it never rises above a temperature which would render the case so warm as to be uncomfortable to the touch due to the circulation of the air through the case and the spacing of the heater coils from the walls of the case.

If by some carelessness the heater is turned or moved over on its side wall or top wall so that some of the louvers become obstructed so that the circulation of air through the heater will be diminished, the mercury switch opens so that the heater is rendered inoperative until it is again placed in its proper operating position. Thus the heater cannot operate in an improper position wherein the circulation of air would be diminished and allow the temperature of the case walls to rise to a value which could burn the skin.

When the automobile is to depart from the theatre, the heater is lifted by its handle, the mercury switch opening when the heater is so lifted, and removed from the passenger compartment through an open window and hung on the bracket 58.

It will be noted that when the heater is supported by the bracket 58, all of the louvers of the side and top walls open downwardly so that rain or other forms of precipitation cannot enter into the interior of the case.

It will be seen now that a new and improved heater has been described and illustrated which is compact and easily assembled and which includes a heater element 42 mounted on a supporting panel or plate 28 which is secured and touches only the end panel 17 whereby the case 11 of the heater is not raised to high temperatures by the conduction of heat thereto from the heater coils. It will also be seen that the heater is provided with a fan 43 driven by a motor 45 mounted on the end panel which draws air from without the case and drives it past the heater elements or coils 42 and back to the exterior of the case. It will also be seen that operation of the motor 45 and the heater coils 42 is controlled by a mercury switch 47 which allows operation of the motor and heater coils only when the heater is in proper position and by a thermostat switch which allows operation of the motor and heater coils only when the temperature of the automobile interior is below a preset or predetermined value.

It will be apparent to those skilled in the art that various changes and modifications can be made in the illustrated embodiment of the invention without departure from the invention and it is intended in the appended claim to cover all such changes and modifications as fall within the true spirit and scope of the invention.

What I claim as new and desire to secure by Letters Patent of the United States is:

A heater comprising: a substantially rectangular case having a pair of parallel side walls, a bottom wall, and a top wall; an end wall and open end panel closing opposite ends of said case; a supporting panel having one end rigidly secured to said end panel and extending into said case, said supporting panel being disposed parallel to said bottom and top walls and between said side walls, said supporting panel being spaced from said walls of said case and from said end wall; a pair of laterally spaced strips mounted on said supporting panel and disposed parallel to and spaced from said side walls adjacent said end wall; heating means mounted on and extending between said strips; a motor mounted on said end panel; and a blower in said case driven by said motor and disposed between said end panel and said heating means; said case walls and said end wall having apertures whereby said blower may circulate air from without the case past said heating means and out of the case through the apertures in said end walls.

References Cited in the file of this patent

UNITED STATES PATENTS

| | | |
|---|---|---|
| 516,878 | Sachs | Mar. 20, 1894 |
| 1,231,056 | Palmer | June 26, 1917 |
| 1,484,156 | Phelan | Feb. 19, 1924 |
| 1,995,886 | Jockers | Mar. 26, 1935 |
| 2,093,419 | Coleman | Sept. 21, 1937 |
| 2,274,469 | Booth | Feb. 24, 1942 |
| 2,408,286 | Aufiero | Sept. 24, 1946 |
| 2,456,781 | Hardey | Dec. 21, 1948 |
| 2,475,113 | Stiles | July 5, 1949 |
| 2,492,248 | Weingardt | Dec. 27, 1949 |
| 2,521,654 | Sandler | Sept. 5, 1950 |
| 2,619,578 | Jepson et al. | Nov. 25, 1952 |